US006075908A

United States Patent [19]

Paniccia et al.

[11] Patent Number: 6,075,908

[45] Date of Patent: Jun. 13, 2000

[54] METHOD AND APPARATUS FOR OPTICALLY MODULATING LIGHT THROUGH THE BACK SIDE OF AN INTEGRATED CIRCUIT DIE

[75] Inventors: Mario J. Paniccia, Santa Clara; Valluri R. M. Rao, Saratoga, both of Calif.; Ian A. Young, Portland, Oreg.

[73] Assignee: Intel Corporation, Santa Clara, Calif.

[21] Appl. No.: 08/993,786

[22] Filed: Dec. 19, 1997

[51] Int. Cl.[7] .............................. G02B 6/12; G02F 1/015

[52] U.S. Cl. .............................. 385/14; 359/245

[58] Field of Search .............................. 385/14, 10, 37; 359/569, 573, 245, 247, 254

[56] References Cited

U.S. PATENT DOCUMENTS

| | | | |
|---|---|---|---|
| 4,422,088 | 12/1983 | Gfeller | 357/19 |
| 4,695,120 | 9/1987 | Holder | 385/14 |
| 4,758,092 | 7/1988 | Heinrich et al. | 356/364 |
| 4,761,620 | 8/1988 | Bar-Joseph et al. | 359/263 |
| 4,865,427 | 9/1989 | Kingston et al. | 359/276 |
| 4,871,224 | 10/1989 | Karstensen et al. | 385/14 |
| 4,917,450 | 4/1990 | Pocholle et al. | 385/10 |
| 4,939,793 | 7/1990 | Stewart | 359/170 |
| 4,966,430 | 10/1990 | Weidel | 385/14 |
| 5,061,027 | 10/1991 | Richard | 385/14 |
| 5,153,770 | 10/1992 | Harris | 359/245 |
| 5,159,700 | 10/1992 | Reid et al. | 385/14 |
| 5,198,684 | 3/1993 | Sudo | 257/79 |
| 5,400,419 | 3/1995 | Heinen | 385/14 |
| 5,432,630 | 7/1995 | Lebby et al. | 359/152 |
| 5,434,434 | 7/1995 | Kasahara et al. | 257/84 |
| 5,485,021 | 1/1996 | Abe | 257/84 |
| 5,502,779 | 3/1996 | Magel | 385/1 |
| 5,568,574 | 10/1996 | Tanguay, Jr. et al. | 385/14 |
| 5,605,856 | 2/1997 | Goosen et al. | 438/24 |
| 5,625,636 | 4/1997 | Bryan et al. | 372/50 |
| 5,625,729 | 4/1997 | Brown | 385/31 |
| 5,629,838 | 5/1997 | Knight et al. | 361/782 |
| 5,638,469 | 6/1997 | Feldman et al. | 385/14 |
| 5,677,783 | 10/1997 | Bloom et al. | 359/224 |
| 5,696,862 | 12/1997 | Hauer et al. | 385/88 |
| 5,835,646 | 11/1998 | Yoshimura et al. | 385/14 |
| 5,864,642 | 1/1999 | Chun et al. | 385/14 |
| 5,872,360 | 2/1999 | Paniccia et al. | 250/341.4 |

OTHER PUBLICATIONS

Miller, DAB: "Reason and Prospects for Dense Optical Interconnections", *Presentation by Stanford University Professor,* (Oct. 1997).

Sakano, S. et al.: "InGaAsP/InP Monolithic Integrated Circuit with Lasers and an Optical Switch," *Electronics Letters,* 22(11), May 1986.

Mansuripur, M. and Goodman, JW: "Signal and Noise in Magneto–Optical Readout," *J. Appl. Phys.,* 53(6), Jun. 1982.

Alping, A et al.: "Highly Efficient Waveguide Phase Modulator for Integrated Optoelectronics," *Appl. Phys. Lett.,* 48(19), May 1986.

(List continued on next page.)

*Primary Examiner*—John D. Lee
*Assistant Examiner*—Michael J. Stahl
*Attorney, Agent, or Firm*—Blakely, Sokoloff, Taylor & Zafman LLP

[57] ABSTRACT

An optical modulator that modulates light through the semiconductor substrate through the back side of a flip chip packaged integrated circuit. The optical modulator of the present invention enables integrated circuit signals to be extracted through the back side of the semiconductor substrate. In one embodiment, an optical modulator is disposed within a flip chip packaged integrated circuit die. The optical modulator includes a deflector and a diffraction grating. An infrared light beam is directed through the back side of a silicon substrate of the integrated circuit die, deflected off the deflector through the diffraction grating and back out the back side of the integrated circuit die. The diffraction grating modulates the phase of a portion of the deflected light beam in response to an integrated circuit signal. A resulting diffraction interference occurs between the phase modulated portions and non-phase modulated portions of the deflected light beam. The interference causes amplitude modulation of a zero order diffraction of the deflected light beam, from which the integrated circuit signal can be extracted.

30 Claims, 6 Drawing Sheets

125 ZERO ORDER DIFFRACTION
123
102 101
103
115 113 119
105
117
109
107
121 121

OTHER PUBLICATIONS

Levitan, SP et al.: "Computer–Aided Design of Free–Space Opto–Electronic Systems," *DAC 97,* Anaheim, California (1997) No Month Avail.

Goodman, JW et al.: "Optical Interconnetions for VLSI Systems," *Proc. IEEE,* 72(7), Jul. 1984.

Wang, C. et al.: "Ultrafast, All–Silicon Light Modulator," *Optics Letters,* 19(18), Sep. 1994.

Tada, K. and Okada, Y: "Bipolar Transistor Carrier–Injected Optical Modulator/Switch: Proposal and Analysis," *IEEE Electr Dev Ltrs,* 7(11), Nov. 1986.

Fernando, C. et al: "Si/$Si_{o.85}$/$Ge_{o.15}$/Si P–I–N Waveguide Optical Intensity Modulator," *SPIE,* vol. 2402(131), 1995 No Month Available.

"Optoelectronic VLSI Foundry Services From Lucent Technologies", *Lucent Technologies Bell Labs Innovations Web Page* at http://www.bell–labs.com/project/oevlsi/, updated Mar. 2, 1997.

"Process for Fabricating OE/VLSI Chips", *Lucent Technologies Bell Labs Innovations Web Page* at http://www-.bell–labs.com/project/oevlsi/wfabproc.html, updated Sep. 26, 1996.

"Detailed Design Rules for Workshop Chips", *Lucent Technologies Bell Labs Innovations Web Page* at http://www-.bell–labs.com/project/oevlsi/wdesrule.html, updated Mar. 7, 1997.

Orobtchouk, R., et al.: "Quasi–TEoo Singlemode Optical Waveguides for Electro–optical Modulation at 1.3 $\mu$m Using Standard SIMOX Material" in *IEEE Proc. Optoelectron,* vol. 144(2) Apr. 1997.

Soref, RA: "Electrooptical Effects of Silicon" in *IEEE J of Quantum Electron.* vol. QE–23(1), Jan. 1997.

Cutolo, A., et al.: "An Electrically Controlled Bragg Reflector Integrated in a Rib Silicon on Insulator Waveguide" in *Appl. Phys. Lett.* vol. 71(2), Jul. 1997.

Raybon, G., et al.: "A Reconfigurable Optoelectronic Wavelength Converter based on an Integrated Electroabsorption Modulated Laser Array" in *1997 Digest of the IEEE/LEOS Summer Topical Meetings,* Montreal, Quebec, Canada, Aug. 1997.

Reiley, DJ, and Sasian JM: "Optical Design of a Free–Space Photonic Switching System" in *Applied Optics,* vol. 36(19), Jul. 1997.

Cutolo, A., et al.: Silicon Electro–Optic Modulator Based on a Three Terminal Device Integrated in a Low–Loss Single–Mode SOI Waveguide in *J. of Lightwave Technology,* vol. 15(3), Mar. 1997.

Koren, U., et al.: "A Polarization Insensitive Semiconductor Optical Amplifier with Integrated Electroabsorption Modulators" in *Integrated Photonics Research,* Apr. 29–May 2, 1996 Technical Digest Series, vol. 6, 1996.

Krishnamoorthy, AV, and Miller, DABM: "Free–Space Optical Interconnections for VLSI Systems: A Technology Roadmap", Conference Proceedings Leos '96 9th Annual MeetingU IEEE Lasers and Electro–Optics (vol. 1), Nov. 1996.

Goosen, KW: "GaAs MQW Modulators Integrated With Silicon CMOS" in *IEEE Photonics Technology Letters,* vol. 7(4), Apr. 1995.

Kuwamura, Y, et al.: "Analysis of Operating Mechanism in Semiconductor Optical Modulator with Electron–Depleting Absorption Control" in *Electronics and Communications in Japan,* vo. 79(5), Dec. 1995.

Liu, MY and Chou, SY: "High–Modulation–Depth and Short–Cavity–Length Silicon Fabry–Perot Modulator with Two Grating Bragg Reflectors" in *Appl. Phys. Lett.* vol. 68(2), Jan. 1996.

Heinrich, HK: "A Noninvasive Optical Probe for Detecting Electrical Signals in Silicon Integrated Circuits", Doctoral Dissertation, Stanford Univ., (Apr., 1987).

METHOD AND APPARATUS FOR OPTICALLY MODULATING LIGHT THROUGH THE BACK SIDE OF AN INTEGRATED CIRCUIT DIE

RELATED APPLICATIONS

This application is also related to co-pending application Ser. No. 08/994,980 filed, Dec. 19, 1997 entitled "Method And Apparatus Providing An Optical Input/Output Bus Through The Back side Of An Integrated Circuit Die," and assigned to the Assignee of the present application.

This application is also related to co-pending application Ser. No. 08/995,277 filed, Dec. 19, 1997 entitled "Method And Apparatus Providing Optical Input/Output Through The Back side Of An Integrated Circuit Die," and assigned to the Assignee of the present application.

BACKGROUND OF THE INVENTION

1. Field of the Invention

The present invention relates generally to integrated circuits and, more specifically, the present invention relates to the modulation of light using integrated circuits.

2. Description of the Related Art

Within the integrated circuit industry there is a continuing effort to increase integrated circuit speed as well as device density. One challenge that integrated circuit designers face with increasing circuit speeds and device densities is the increasingly significant propagation delays of circuit inputs and outputs due to the capacitive loading associated with off chip circuit connections. At slower clock speeds, the capacitive loading on integrated circuit lines is generally not a significant factor. However, as newer integrated circuit design clock speeds continue to climb towards the gigahertz range and beyond, it is evident that one of the major bottlenecks for future integrated circuits, such as for example but not limited to microprocessors, off chip caches, controllers, etc., will be the input/output bandwidth and/or round trip delay between and within chips.

Prior art attempts to address the capacitive loading problems associated with increased integrated circuit speeds and device densities have resulted in the use of larger and more powerful integrated circuit input/output drivers on the chip. Undesirable consequences of utilizing larger input/output drivers include the facts that the larger input/output drivers generally consume more power, create large di/dt noise, which requires low inductance packaging and large amount of on-die decoupling capacitance to provide a means of noise suppression, dissipate more heat and occupy more of valuable area on the integrated circuit die than smaller integrated circuit input/output drivers.

Other prior art attempts to overcome traditional integrated circuit interconnection limitations have included the use of optical interconnections. The prior art attempts at optical interconnections between integrated circuits have generally involved or have been based on two typical approaches.

One approach has been based on either using gallium arsenide (GaAs) laser diodes and modulating or switching the diodes electrically or by using GaAs built modulators that amplitude modulate a laser beam passing through the integrated circuit. The modulation is generally based on electroabsorption through strained multi-layer grown molecular beam epitaxy (MBE) films in GaAs integrated circuits. As can be appreciated to those skilled in the art, it is difficult and therefore impractical to integrate or combine III-V based technology, which includes GaAs, with standard silicon based complementary metal oxide semiconductor (CMOS) technology.

The second typical prior art approach is based on using silicon based optical waveguides. These waveguides are generally built using Silicon-on-Insulator (SOI) based processing techniques. Prior art SOI based modulators utilize silicon waveguide structures to switch light passing through the optical waveguide. The switching mechanism however utilizes injection of carriers into the waveguide rather like in a bipolar based transistor. One consequence of this is slow speed, for example up to several hundred megahertz, and very high power consumption, for example 10 mW or more for a single switch. In order to increase the modulation depth, one often tries to obtain a large interaction volume between the injected charge and the light beam. This is generally accomplished by making very long waveguides, for example on order of thousands of microns, thereby increasing the interaction length through which the light beam travels. As can be appreciated to those skilled in the art, actual incorporation of SOI waveguides into existing multi-layer standard CMOS based processing however is not straight forward. Hence, utilization of these waveguide structures becomes quite impractical when used for high speed input/output in large transistor count microprocessors.

Accordingly, what is desired is a method and an apparatus for optically modulating light using integrated circuit elements with voltage or current signals. Such a method and apparatus should enable signals to be extracted from integrated circuits for uses including, for example, optical input/output, silicon debug testing, etc. In order to reduce the impact on present day CMOS processes, such a method and apparatus should be compatible with present day CMOS integrated circuit processing technology. It is also desired that one should be able to implement such a method and apparatus without significant change to existing process technology. In addition, such a method and apparatus should also be compatible with present day flip chip package technology.

SUMMARY OF THE INVENTION

An integrated circuit device is disclosed. In one embodiment, a first deflector is disposed within a flip chip packaged integrated circuit die. A plurality of integrated circuit devices are arranged to form a diffraction grating in a semiconductor substrate of the integrated circuit die. Each one of the integrated circuit devices is coupled to a signal. A light beam enters through a back side of the integrated circuit die and is optically coupled to the diffraction grating through the semiconductor substrate and is deflected from the first deflector. A diffracted light beam is propagated away from the diffraction grating and is modulated in response to the signal. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

A method and an apparatus providing optical input/output in an integrated circuit is disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

The present invention provides an optical modulator that enables integrated circuit signals to be extracted from the output circuit nodes through the back side of the semiconductor substrate of an integrated circuit die. In one embodiment, an optical modulator is disposed within a flip chip packaged integrated circuit die. An infrared light beam, with a wavelength such that the photon energy is lower than the semiconductor band gap, is directed through the back side of a silicon substrate of the integrated circuit die, passes through the optical modulator and is deflected back out of the back side of the integrated circuit die. In one embodiment, the presently described optical modulator includes a diffraction grating. The diffracting property of the diffraction grating is modulated in response to an integrated circuit signal. In one embodiment, the described diffraction grating modulates the phase of a portion of the deflected light beam in response to the applied signal. A resulting diffraction interference occurs between the phase modulated portions and non-phase modulated portions of the deflected light beam. The interference of the two beams results in an amplitude modulation of the zero order diffraction of the deflected light beam, from which the integrated circuit output signal can be extracted.

Figure 1A:
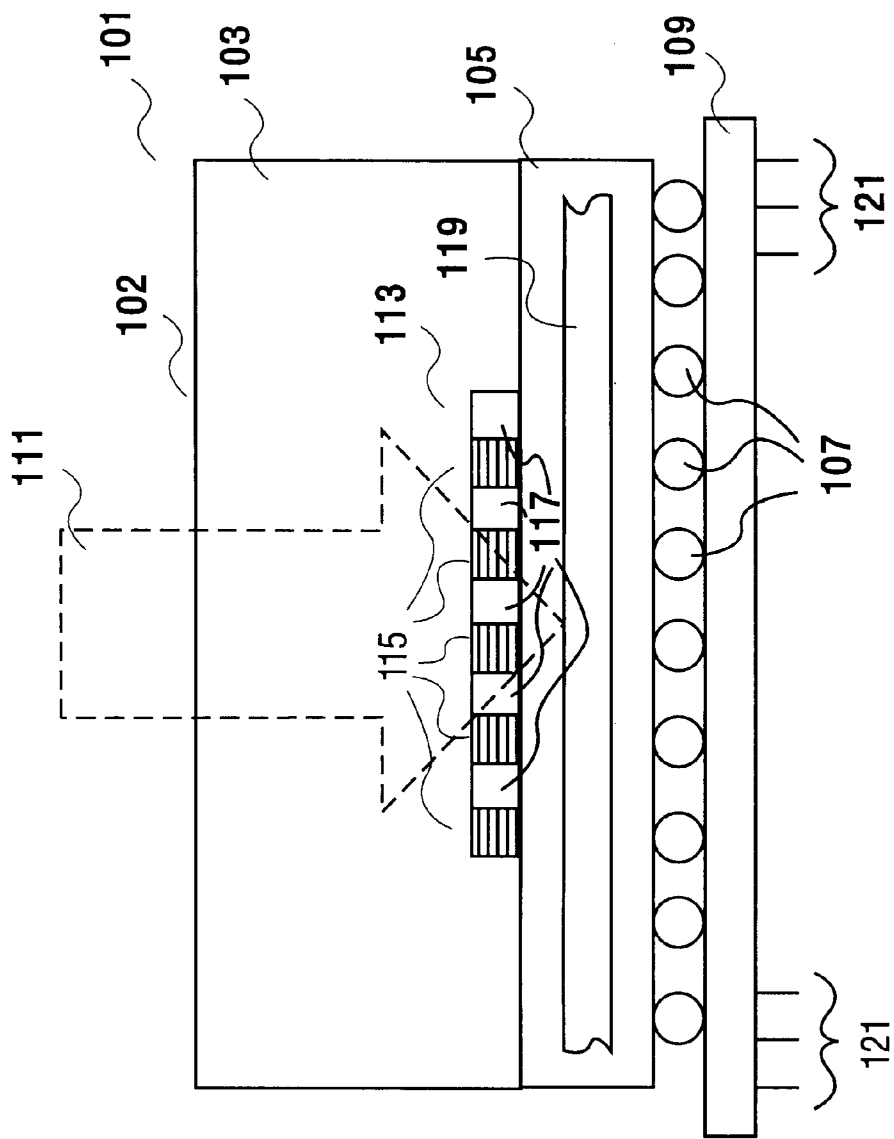
FIG. 1A is an illustration of a cross section of one embodiment of a flip chip packaged integrated circuit die with light entering the from the back side in accordance with the teachings of the present invention.

To illustrate, FIG. 1A shows one embodiment of an integrated circuit die 101 including an optical modulator in accordance with the teachings of the present invention. In one embodiment, integrated circuit die 101 is a controlled collapse circuit connection (C4) or flip chip packaged integrated circuit die coupled to package substrate 109 through ball bonds 107. As can be appreciated by those skilled in the art, ball bonds 107 provide more direct connections between the internal integrated circuit nodes of integrated circuit die 101 and the pins 121 of package substrate 109, thereby reducing inductance problems associated with typical wire bond integrated circuit packaging technologies. Another characteristic of flip chip packaging is that full access to a back side 102 of integrated circuit die 101 is provided.

In one embodiment, the optical modulator of the present invention includes a diffraction grating 113 disposed within the semiconductor substrate 103 of integrated circuit die 101. In one embodiment, diffraction grating 113 is electrically addressable and switchable, and includes an arrangement of a plurality of charged regions 115 distributed among a plurality of uncharged regions 117.

It is noted that for purposes of this disclosure, a "charged" region may simply be interpreted as a highly charged region having free charge carriers and an "uncharged" region may simply be interpreted as a region substantially without free charge carriers.

In one embodiment, a light beam 111 is directed through back side 102 into semiconductor substrate 103 and is deflected from a deflector 119, as shown in FIG. 1A. In one embodiment, semiconductor substrate 103 includes silicon and light beam 111 includes infrared light with a wavelength such that the photon energy is lower than the semiconductor band gap. As known to those skilled in the art, silicon is partially transparent to infrared light. In one embodiment, deflector 119 is a conductor, such as for example but not limited to a metal layer disposed in a dielectric isolation layer 105 of integrated circuit die 101.

Figure 1B:
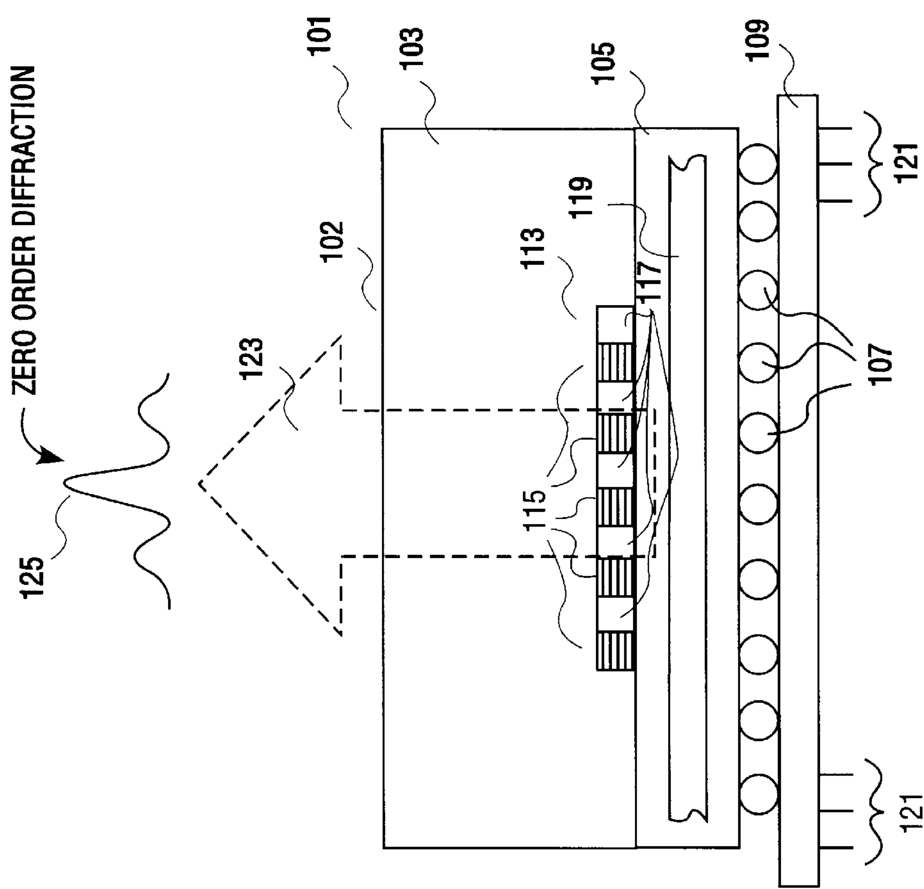
FIG. 1B is an illustration of a cross section of one embodiment of a flip chip packaged integrated circuit die with light being reflected from an optical modulator in accordance with the teachings of the present invention.

Referring now to FIG. 1B, integrated circuit die 101 of FIG. 1A is shown with a diffracted light beam 123 being deflected from deflector 119 through diffraction grating 113. As shown in FIG. 1B, a portion of both the incoming and the outgoing diffracted light beam 123 passes through charged regions 115 and another portion of the incoming and outgoing diffracted light beam 123 passes through uncharged regions 117. In one embodiment, the amount of free charge in charged regions 115 is modulated in response to an integrated circuit output signal in integrated circuit die 101. In one embodiment, the amount of free charge in uncharged regions 117 is not modulated in response to the integrated circuit signal of integrated circuit die 101.

In one embodiment, diffraction grating 113 is a silicon phase grating including a two dimensional array of complementary metal oxide semiconductor (CMOS) integrated circuit devices. As will be discussed in greater detail below, the phase of the portion of diffracted light beam 123 passing through charged regions 115 is modulated due to the plasma optical effect. In contrast, the phase of the portion of diffracted light beam 123 passing through uncharged regions 117 is not modulated in response to the integrated circuit signal.

The plasma optical effect arises due to an interaction between the optical electric field vector and free charge carriers that may be present along the propagation path of the light beam 111. The electric field of the light beam 111 polarizes the free charge carriers and this effectively perturbs the local dielectric constant of the medium. This in turn leads to a perturbation of the local velocity of the optical wave and hence the refractive index for the light, since the refractive index is simply the ratio of the speed of the light in vacuum to that in the medium. The free charge carriers also lead to absorption of the optical field as optical energy is used up, to accelerate the free charge carriers. Generally the refractive index perturbation is a complex number with the real part being that part which causes the velocity change and the imaginary part being related to the free charge carrier absorption. The amount of phase shift due to free charge carriers due to the plasma optical effect is given by:

$$\phi = n_o \omega_p^2 \lambda L / (4\pi c^2) \quad \text{(Equation 1)}$$

where $\phi$ is the phase shift, $n_o$ is the nominal index of refraction, $\omega_p^2$ is the plasma optical frequency, $\lambda$ is the wavelength of light, L is the thickness of the free charge carrier region and c is the speed of light.

As a result of the phase shifting due to the plasma optical effect, interference occurs between the phase modulated and non-phase modulated portions of the diffracted light beam 123 causing constructive and destructive interference in the wavefronts that propagate away from diffraction grating 113. Accordingly, the zero order diffraction 125 of diffracted light beam 123 that passes through and propagates away from diffraction grating 113 is amplitude modulated in response to the integrated circuit output signal that modulates the amount of free charge in charged regions 115. Thus, the integrated circuit signal may be extracted from the integrated circuit through the amplitude modulated zero order diffraction 125 of diffracted light beam 123.

Figure 2A:
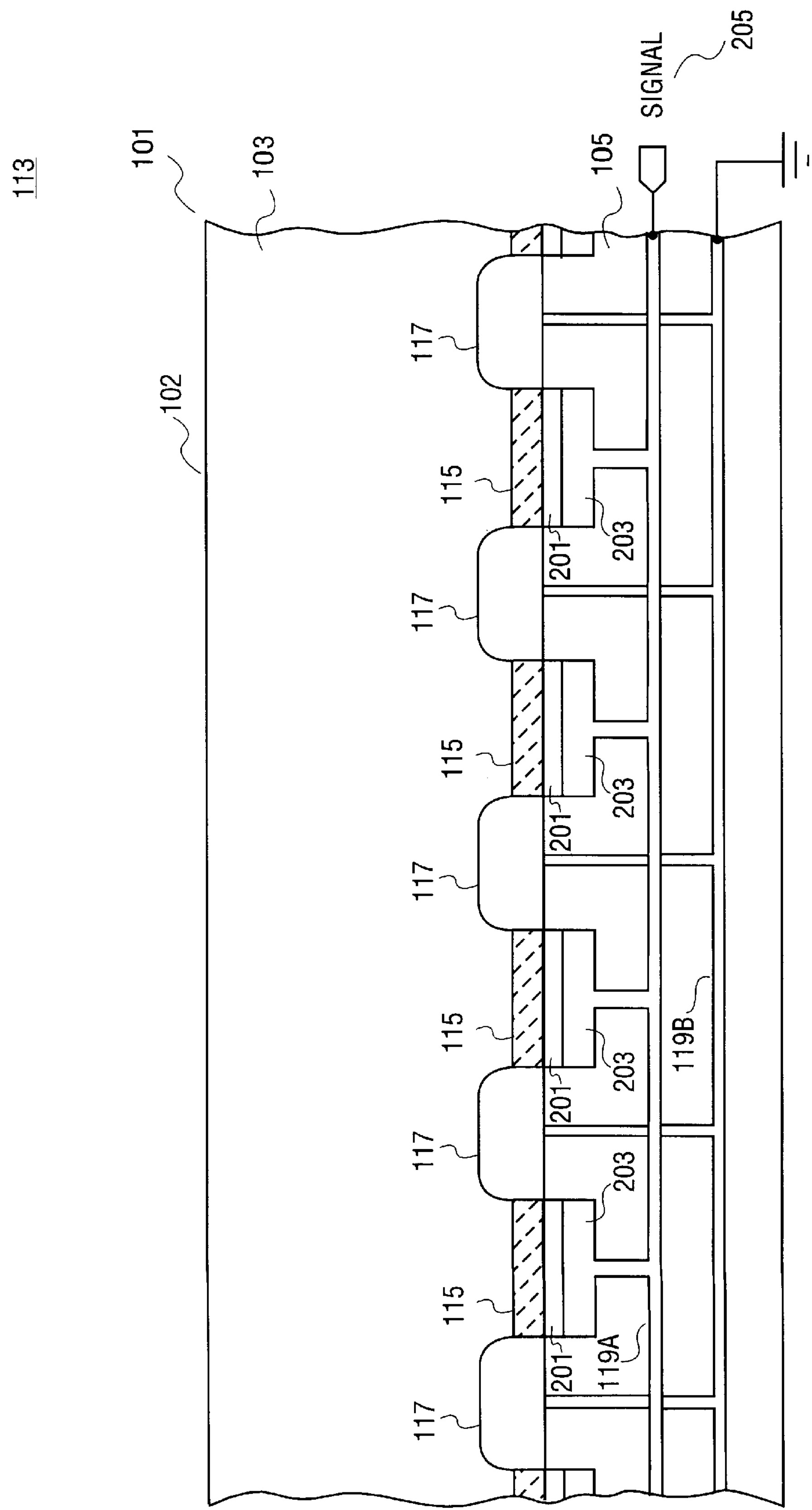
FIG. 2A is an illustration of a cross section of one embodiment of an optical modulator having a diffraction grating in accordance with the teachings of the present invention.

FIG. 2A is an illustration of a cross section of one embodiment diffraction grating 113. In one embodiment, diffraction grating 113 includes a plurality of CMOS integrated circuit devices or structures. In one embodiment the CMOS integrated circuit devices include CMOS transistors coupled as metal oxide semiconductor field effect transistor (MOSFET) capacitors with source and drain shorted together. In particular, FIG. 2A shows a plurality of source/drain diffusion regions 117 disposed in a silicon substrate 103 of a flip chip packaged integrated circuit die 101. In one embodiment, polysilicon gates 203 are disposed in a dielectric isolation layer 105 between each one of the plurality of diffusion regions 117. As also shown in FIG. 2A, a gate oxide 201 is disposed between each polysilicon gate 203 and silicon substrate 103. In the embodiment shown, each diffusion region 117 is commonly coupled through conductor 119B to a common potential, such as for example ground for n channel MOSFETs or $V_{cc}$ for p channel MOSFETs. Each one of the polysilicon gates 203 are commonly coupled to a signal 205 through conductor 119A.

In operation, with the commonly coupled diffusion regions 117 coupled to the common potential and polysilicon gates 203 coupled to signal 205, the integrated circuit devices are biased in one embodiment to form highly charged inversion layers in the channels 115, which are disposed between each one of the diffusion regions 117 in silicon substrate 103. The amount of free charge in inversion layers 115 is modulated in response to input signal 205. To illustrate, in one embodiment diffusion regions 117 include N+ diffusion disposed in a P-type semiconductor substrate 103. In another embodiment, diffusion regions 117 include P+ diffusion disposed in an N-type semiconductor substrate 103.

In the embodiment illustrated in FIG. 2A, each one of diffusions 117 are N+ diffusions that are commonly coupled to ground through conductor 119B. Each one of the integrated circuit devices shown therefore form negative charge in channels 115 that form capacitors coupled to signal 205. The amount of free charge in the charged inversion layers, or channels 115, is modulated in response to signal 205. In one embodiment, capacitor structures are utilized instead of MOS transistor structures as the non-mobile inversion layer in the MOSFET capacitor channel is used to modulate the optical infrared light.

Figure 2B:
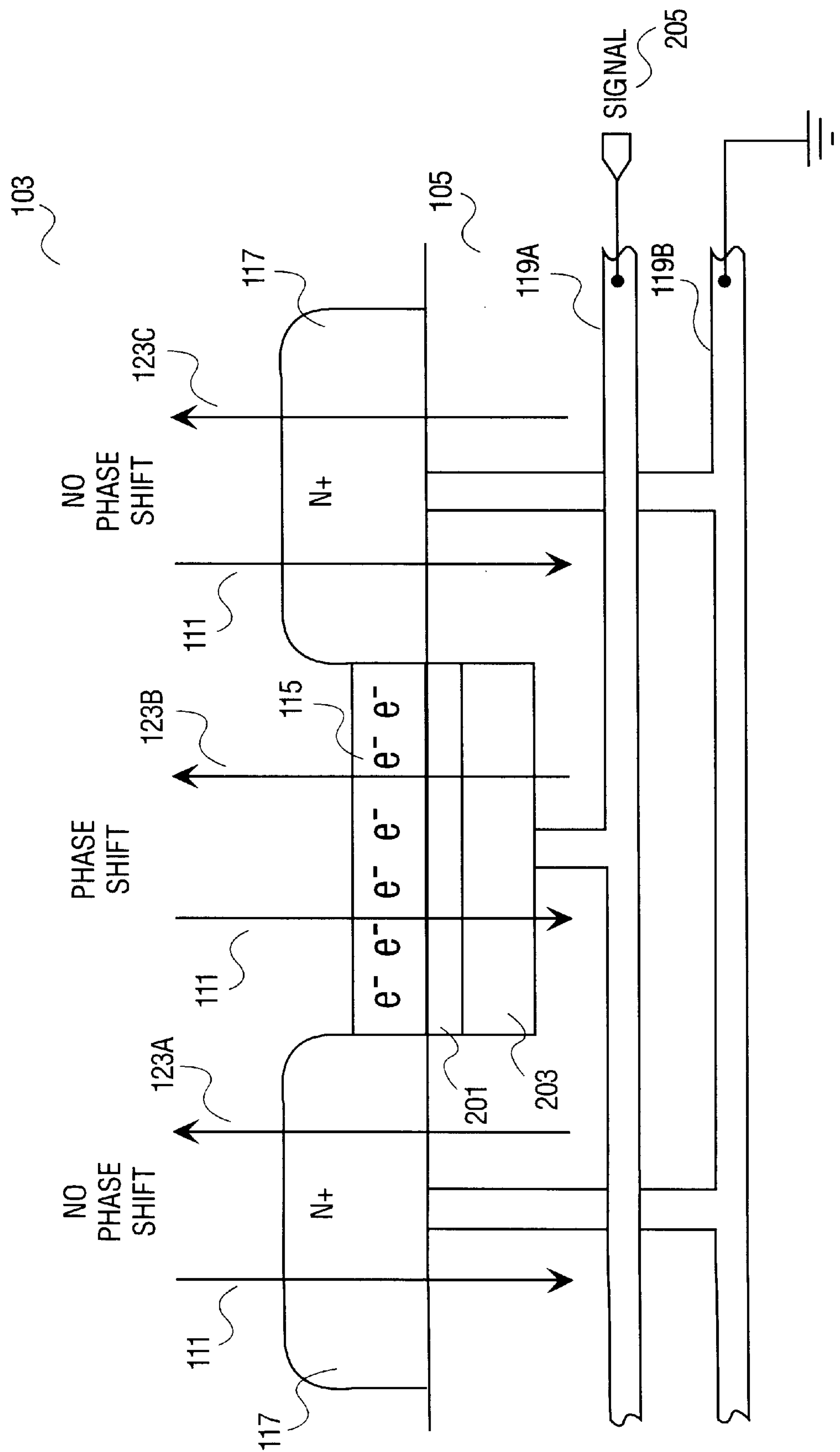
FIG. 2B is an illustration showing greater detail of an element of one embodiment of a cross section of the optical modulator having a diffraction grating in accordance with the teachings of the present invention.

FIG. 2B is a cross section one of the integrated circuit devices of diffraction grating 113 shown in greater detail. In particular, FIG. 2B shows source/drain diffusion regions 117 disposed in a silicon substrate 103. Channel 115 is disposed in the silicon substrate 103 between the diffusion regions 117. As shown in FIG. 2B, gate oxide layer 201 and a polysilicon gate 203 are disposed in dielectric isolation layer 105 proximate to channel 115. Diffusion regions 117 are N+ diffusion regions that are commonly coupled to ground through conductor 119B. A highly charged inversion layer is formed in channel 115. Polysilicon gate 203 is coupled to signal 205 through conductor 119A. The amount of free charge in channel 115 is modulated in response to signal 205.

FIG. 2B illustrates light beam 111 passing through each of the diffusion regions 117 as well as channel 115. Light beam 111 is deflected off a deflector, which in one embodiment may be a conductor 119A or 119B, and back out of the semiconductor substrate 103. As shown in FIG. 2B, deflected light beams 123A and 123C pass through diffusion regions 117. Deflected light beam 123B passes through the modulating inversion layer of channel 115.

As discussed above, deflected light beam 123B is phase shifted due to the free charge carriers in channel 115 due to the plasma optical effect. Since the amount of free charge in channel 115 is modulated in response to signal 205, the phase of deflected light beam 123B is also modulated in response to signal 205. In contrast, there is no relative phase shift in deflected light beams 123A and 123C since there is substantially no free charge in diffusion regions 117.

Referring briefly back to FIG. 2A, the alternating arrangements of diffusion regions 117 and channels 115 form a two dimensional phase array, or phase diffraction grating, which cause constructive and destructive interference in the wavefronts that propagate away from diffraction grating 113. Since the amount of phase shift in the deflected light beams that pass through channels 115 is modulated in response to signal 205, the optical power in the zero order diffraction beam is modulated accordingly. As the grating is turned on and off the total optical power in the deflected beam that comes back out of the silicon is unaltered, but when the grating is activated with a signal, optical power is redistributed due to interference from the zero order to higher orders. The key to detecting the power modulation is either to only look at the zero order diffraction or only look at all or some of the higher orders but not the zero order. If one looks at the zero order diffraction, the photodetector sees a nominal direct current (DC) power with the grating off and a slightly reduced power when the modulator is turned on. When looking at the higher orders of diffraction, the photodetector sees zero power with the grating off and a finite power with the grating on. Using known techniques in optical signal recovery, signal 205 can be extracted from the modulated zero order diffraction or the higher order diffractions of the deflected light beams.

The present invention may be used for a variety of purposes that would benefit from being able to extract signals from the integrated circuit. Uses include, but are not limited to, optical input/output, silicon debug testing, etc. It is noted that other uses for optical modulators are described in co-pending application Ser. No. 08/994,980, filed Dec. 19, 1997 entitled "Method And Apparatus Providing An Optical Input/Output Bus Through The Back Side Of An Integrated Circuit Die," and in Ser. No. 08/995,277, filed Dec. 19, 1997 entitled "Method And Apparatus Providing Optical Input/Output Through The Back Side Of An Integrated Circuit Die," both of which are assigned to the Assignee of the present application.

It is observed in Equation 1 above that the amount of phase shift is dependent upon the thickness L of the charged region due to plasma optical effect. Typical inversion layers found in many of today's advanced CMOS technology are quite thin, for example on the order of approximately 5 nm. From FIG. 2B one can observe that the path length L through which the optical beam passes is thus very small. This may result, depending on the free charge carrier density, in a very small phase shift. Correspondingly, this will result in a very small amplitude modulation. With limitation to how much one can change the free charge carrier density in the inversion layer, it is evident that it would be beneficial to increase the interaction length L for which the optical beam passes. That is, by increasing the path length L, one can increase the plasma optical induced phase shift and as a result, increase the amplitude modulation. One embodiment for accomplishing this is discussed in more detail below.

Figure 3:
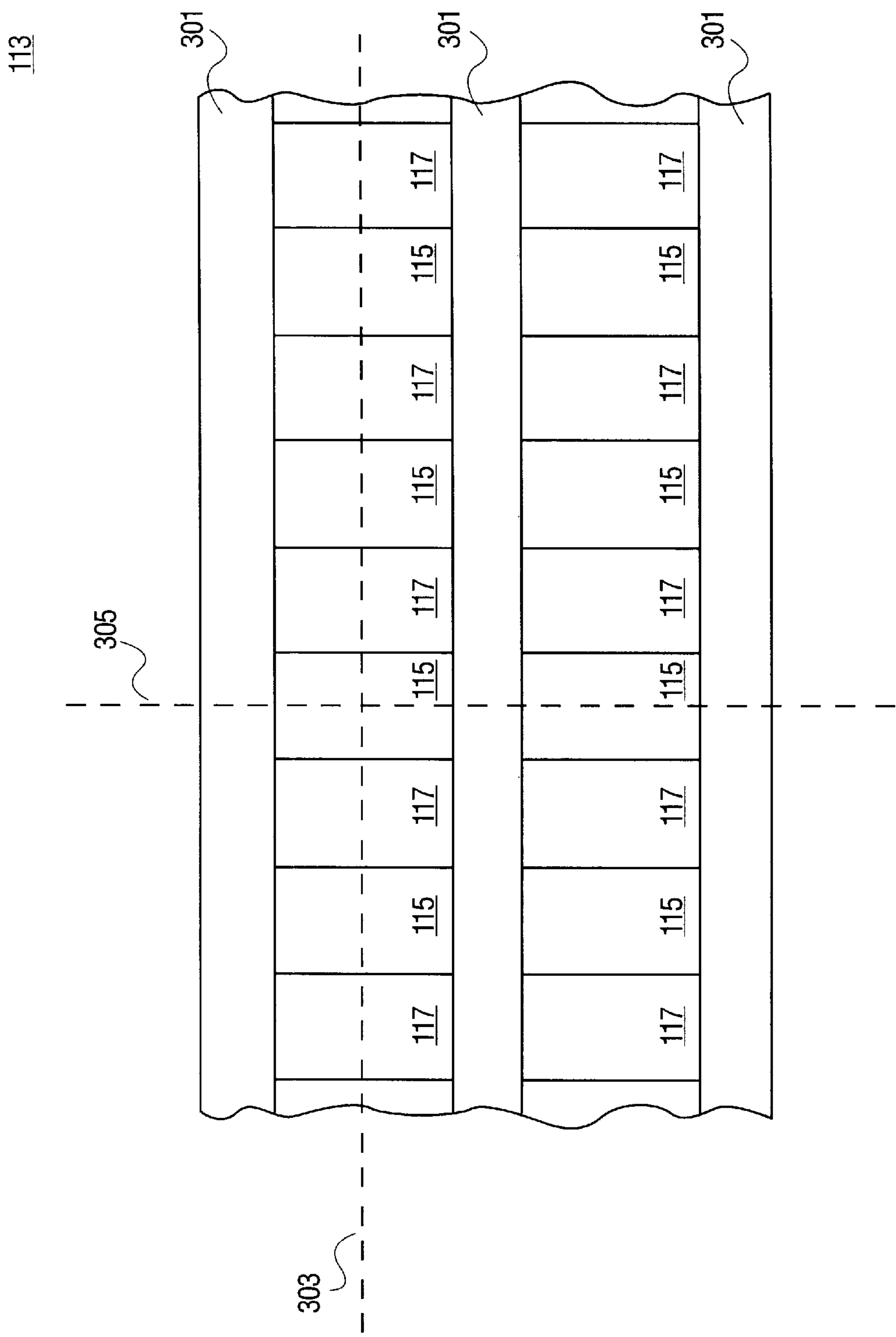
FIG. 3 is an illustration of a top view of one embodiment of a diffraction grating of the optical modulator showing integrated circuit devices arranged in a two dimensional array in accordance with the teachings of the present invention.

FIG. 3 is a top view diagram of one embodiment of a diffraction grating 113 in accordance with the teachings of the present invention. As shown in FIG. 3, diffusion regions 117 are alternatingly distributed in the semiconductor substrate with channels 115 disposed between each one of the diffusion regions 117. As shown in FIG. 3, a plurality of rows of the source-drain diffusion/channel/source-drain diffusion arrangements of the present invention are formed in diffraction grating 113 with isolation oxide regions 301 disposed between each row. As appreciated to those skilled in the art, isolation oxide regions 301 are commonly utilized in CMOS processes to isolate the circuit nodes on diffusions 117 from each other and/or from nearby MOSFET channels. With the two dimensional array of diffusions 117 and channels 115, the diffraction grating 113 of the present invention is formed.

Figure 4:
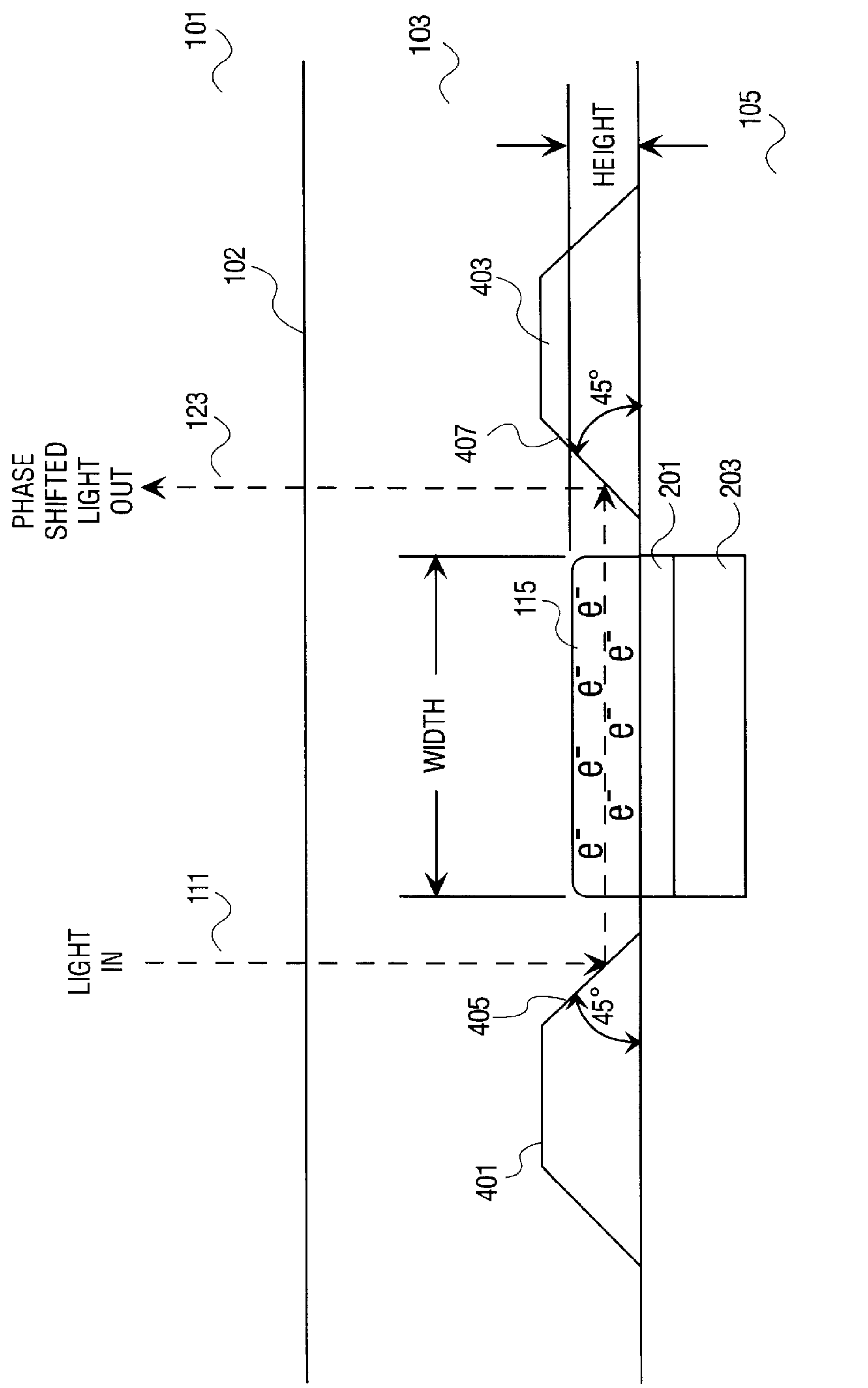
FIG. 4 is an illustration of cross section of one embodiment of a diffraction grating of the optical modulator showing the edges of isolation oxide islands being used to deflect light down a transistor channel and back out of the integrated circuit die in accordance with the teachings of the present invention.

It is appreciated that FIGS. 2A and 2B are cross section illustrations of diffraction grating 113 along dashed line 303 of FIG. 3. An alternate embodiment of the present invention is discussed below in connection with FIG. 4, which is a cross section of one embodiment of diffraction grating 113 along dashed line 305. As shown in FIG. 4, a cross section of channel 115 is shown in semiconductor substrate 103 of flip chip packaged integrated circuit die 101. In the embodiment shown, channel 115 is disposed between an isolation oxide island 401 and an isolation oxide island 403. In one embodiment, an edge 405 of isolation oxide island 401 is a first deflector and an edge 407 of isolation oxide island 403 is a second deflector. As shown in FIG. 4, a light beam 111 is directed into the semiconductor substrate 103 through the back side 102 of flip chip packaged integrated circuit die 101. As shown in FIG. 4, light beam 111 is deflected off edge 405 of isolation oxide island 401 and passes along through the width of channel 115 and is then deflected off edge 407 of isolation oxide island 403 back out of semiconductor substrate 103 through back side 102. Thus, deflected light beam 123 is phase shifted as a result of being passed through and along the width of channel 115.

In comparison with the embodiment of the present invention illustrated in FIGS. 1A–2B, deflected light beam 123 travels a further distance through the highly charged inversion layer of channel 115 since it is deflected down along the width of channel 115 instead of merely traveling back and forth through the height of channel 115. Indeed, in one embodiment, the width of a channel 115 is substantially longer than the height of channel 115. Therefore, in accordance with Equation 1 above, since deflected light 123 travels a further distance through a highly charged region, the phase modulation of deflected beam 123 of FIG. 4 is greater than the phase modulation of deflected beam 123 of FIGS. 2A and 2B, assuming the same amount of free charge in channel 115.

In another embodiment, edges 405 and 407 of isolation oxide islands 401 and 403, respectively, are etched to shape edges 405 and 407 such that an increased amount of light beam 111 is deflected along and through the width of channel 115 to isolation oxide island 403 and back out semiconductor substrate 103 through back side 102. In one embodiment, edges 405 and 407 of isolation oxide islands 401 and 403, respectively, are etched to 45 degree angles relative to the path of light beam 111 and deflected light beam 123.

In another embodiment, it is appreciated that isolation oxide islands 401 and 403 may be substituted with other materials, such as for example but not limited to metals or other reflective materials such that light beam 111 is deflected along and through the width of channel 115 and back out the back side 102 of semiconductor substrate 103. With the increased phase shift of deflected light beam 123 in FIG. 4, it is appreciated that the amplitude modulation of the zero order diffraction of deflected beam 123 is increased.

Thus, what has been described is a method and an apparatus for optically modulating light through the back side of an integrated circuit die. It is appreciated that the optical modulator of the present invention is compatible with existing present day CMOS processing techniques as well as flip chip packaged integrated circuit dice such that the present invention may be readily implemented into present day existing CMOS processors. This allows one to optically read internal signals of an integrated circuit non-invasively, through the silicon back side. Since the presently described optical modulator is based on standard CMOS process, the optical modulator of the present invention can be implemented with no significant change to existing technology.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An optical modulator, comprising:

a first deflector disposed within an integrated circuit die;

a diffraction grating including a metal oxide semiconductor (MOS) transistor structure in a semiconductor substrate of the integrated circuit die, the MOS transistor structure including a gate, a drain region, a source region and a channel disposed between the drain region and source region, the source and drain regions commonly coupled so as to form a capacitor, the MOS transistor structure being coupled to receive a signal, the first deflector to deflect a light beam that enters through a back side of the integrated circuit die through the MOS transistor structure, the MOS transistor structure to diffract the light beam to create a diffracted light beam, the MOS transistor structure further to modulate the deflected light beam in response to the signal.

2. The optical modulator of claim 1 wherein the channel is coupled such that charge in the channel is modulated in response to the signal, a first portion of the diffracted beam being deflected through the channel and back out of the semiconductor substrate through the back side, a second portion of the diffracted light beam being deflected back out of the semiconductor substrate through the back side without passing through the channel.

3. The optical modulator of claim 2 wherein the gate is coupled to receive the signal.

4. The optical modulator of claim 2 further comprising a second deflector disposed within the integrated circuit die, the first portion of the diffracted light beam being deflected off the first deflector through and along the channel to the second deflector, the second deflector to deflect the first portion of the diffracted light beam back out of the semiconductor substrate through the back side.

5. The optical modulator of claim 4 wherein the first deflector comprises a first insulating region disposed in the semiconductor substrate and the second deflector comprises a second insulating region disposed in the semiconductor substrate.

6. The optical modulator of claim 4 wherein the first deflector comprises a first conductor disposed in the semiconductor substrate and the second deflector comprises a second conductor disposed in the semiconductor substrate.

7. The optical modulator of claim 1 wherein the first deflector comprises a first conductor disposed in a dielectric isolation layer of the integrated circuit die.

8. The optical modulator of claim 3 wherein the source and drain regions of the MOS transistor structure are commonly coupled to receive a first potential such that the MOS transistor structure forms the capacitor.

9. The optical modulator of claim 1 wherein the signal is generated by an integrated circuit output node in the integrated circuit die.

10. The optical modulator of claim 2 wherein the MOS transistor structure is provided to amplitude modulate a zero order diffraction of the diffracted light beam due to interference occurring between the first and second portions of the diffracted light beam.

11. The optical modulator of claim 1 wherein the semiconductor substrate comprises silicon and the light beam comprises infrared light.

12. The optical modulator of claim 1 wherein the light beam comprises an infrared laser beam.

13. The optical modulator of claim 1 wherein the MOS transistor structure is included among a plurality of complementary metal oxide semiconductor (CMOS) transistors.

14. The optical modulator of claim 2 wherein the MOS transistor structure is provided to amplitude modulate a non-zero order diffraction of the diffracted light beam due to interference occurring between the first and second portions of the diffracted light beam.

15. The optical modulator of claim 1 wherein the integrated circuit die comprises a flip chip packaged integrated circuit die.

16. A method of modulating a light beam, the method comprising the steps of:

diffracting the light beam received through a back side of an integrated circuit die and through a diffraction grating including a metal oxide semiconductor (MOS) transistor structure including a gate, a drain region, a source region and a channel disposed between the drain region and the source region to generate a diffracted light beam, the drain and source regions commonly coupled so as to form a capacitor;

modulating a phase of a portion of the diffracted light beam that passes through the channel in response to a signal; and deflecting the diffracted light beam back out the back side of a semiconductor substrate.

17. The method of claim 16 wherein diffracting the light beam received through the back side of the integrated circuit die comprises providing an infrared light beam to direct through a silicon semiconductor substrate of the integrated circuit die.

18. The method of claim 16 wherein modulating the phase of the portion of the diffracted light beam comprises deflecting the portion of the diffracted light beam through the back side of the semiconductor substrate.

19. The method of claim 16 wherein modulating the phase of the portion of the diffracted light beam comprises:

deflecting the portion of the diffracted light beam through the channel; and deflecting the portion of the diffracted light beam deflected through the channel back out the back side of the integrated circuit die.

20. The method of claim 19 wherein a first deflector and a second deflector are disposed in the semiconductor substrate, wherein the first deflector includes an edge of a first insulation region and the second deflector includes an edge of a second insulation region.

21. The method of claim 20 further comprising:

etching the edge of the first insulation region to optically couple the first and second insulation regions; and etching the edge of the second insulation region to optically couple the first and second insulation regions.

22. The method of claim 19 wherein a first deflector and a second deflector are disposed in the semiconductor substrate, wherein the first deflector includes a first conductor disposed in the semiconductor substrate and the second deflector includes a second conductor disposed in the semiconductor substrate such that the first and second conductors are optically coupled through the plurality of charged regions.

23. The method of claim 16 wherein modulating the phase of the portion of the diffracted light beam comprises modulating a charge in the channel in response to the signal.

24. The method of claim 16 wherein an amplitude modulation in the diffracted light beam results from modulating the phase of the portion of the diffracted light beam, wherein the amplitude modulation occurs in a zero order diffraction of the diffracted light beam.

25. The method of claim 16 wherein an amplitude modulation in the diffracted light beam results from modulating the phase of the portion of the diffracted light beam, wherein the amplitude modulation occurs in a non-zero order diffraction of the diffracted light beam.

26. The method of claim 19 wherein the step of modulating the phase of the portion of the diffracted light beam comprises amplitude modulating the diffracted light with interference between a portion of the diffracted beam that does not pass through the channel and the portion of the diffracted light beam deflected through the channel.

27. A method of providing an optical modulator, the method comprising:

providing a diffraction grating including a metal oxide semiconductor (MOS) transistor structure in a semiconductor substrate of an integrated circuit die, the MOS transistor structure including a gate, a drain region, a source region and a channel disposed between the source region and the drain region;

commonly coupling the drain and source regions so as to form a capacitor;

coupling the gate to receive a signal to change charge in the channel in response to the signal; and disposing a deflector in the integrated circuit die proximate to the MOS transistor structure to deflect a light beam received through the back side of the semiconductor substrate through the MOS transistor structure to create a modulated light beam.

28. The method of claim 27 further comprising:

including the MOS transistor structure among a plurality of complementary metal oxide semiconductor (CMOS) transistor structures, each one of the CMOS transistor structures including a gate, a drain region, a source region and a channel disposed between the drain region and the source region;

commonly coupling each one of the gates of the CMOS transistor structures to the integrated circuit signal; and commonly coupling each one of the source and drain regions of the plurality of CMOS transistor structures to a first potential such that the plurality of integrated circuit structures form a plurality of capacitors.

29. An optical modulator, comprising:

a diffraction grating including a metal oxide semiconductor (MOS) transistor structure having a gate, a drain region, a source region and a channel disposed between the drain region and the source region in a semiconductor substrate, the drain and source regions commonly coupled so as to form a capacitor, the MOS transistor structure coupled to receive a signal, the MOS transistor structure having a highly charged channel to modulate in response to the signal a light beam optically coupled to the MOS transistor.

30. The optical modulator of claim 29 further comprising a deflector disposed proximate to the MOS transistor structure to deflect the light beam out of the semiconductor substrate.

* * * * *